(12) United States Patent
    Spindler

(10) Patent No.: US 10,384,406 B2
(45) Date of Patent: Aug. 20, 2019

(54) DEVICE FOR DELIVERING A MEDIUM

(71) Applicant: Illinois Tool Works Inc., Glenview, IL (US)

(72) Inventor: Martin P. Spindler, Berlin (DE)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/873,479

(22) Filed: Jan. 17, 2018

(65) Prior Publication Data

US 2018/0142680 A1     May 24, 2018

Related U.S. Application Data

(62) Division of application No. 14/855,955, filed on Sep. 16, 2015, now abandoned.

(30) Foreign Application Priority Data

Sep. 24, 2014  (DE) .................. 10 2014 113 837

(51) Int. Cl.
    *B29C 73/16*     (2006.01)
    *F04B 35/01*     (2006.01)
    *F04B 39/12*     (2006.01)
    *B29L 30/00*     (2006.01)

(52) U.S. Cl.
    CPC ............ *B29C 73/166* (2013.01); *F04B 35/01* (2013.01); *F04B 39/123* (2013.01); *B29L 2030/00* (2013.01)

(58) Field of Classification Search
    CPC ...... B29C 73/025; B29C 73/166; F04B 33/02
    See application file for complete search history.

(56) References Cited

U.S. PATENT DOCUMENTS

| 3,357,598 A | * | 12/1967 | Kraft ................... B67D 1/0043 137/889 |
| 6,095,758 A | * | 8/2000 | Chou ...................... F04B 35/04 417/374 |
| 2007/0221287 A1 | * | 9/2007 | Izumoto ................ B29C 73/166 141/38 |

FOREIGN PATENT DOCUMENTS

| CN | 101208516 A | 6/2008 |
| DE | 10314075 A1 | 10/2004 |
| DE | 102004042911 A1 | 3/2006 |
| EP | 1419876 A2 | 5/2004 |
| EP | 1747878 A1 | 1/2007 |

* cited by examiner

*Primary Examiner* — Timothy L Maust
*Assistant Examiner* — Timothy P. Kelly
(74) *Attorney, Agent, or Firm* — Christopher R. Carroll; The Small Patent Law Group LLC

(57) ABSTRACT

In a device for delivering a medium, especially tire sealant, which is to be delivered by means of a compressor from a container to a tire, wherein the compressor can be connected by a pipeline to the tire and a connection to the container emerges into this pipeline, the pipeline has a constriction upstream from the tire.

11 Claims, 5 Drawing Sheets

DEVICE FOR DELIVERING A MEDIUM

CROSS-REFERENCE TO RELATED APPLICATIONS

This application is a divisional of U.S. patent application Ser. No. 14/855,955, filed Sep. 16, 2015, titled "DEVICE FOR DELIVERING A MEDIUM," the entire disclosure of which is incorporated herein by reference, which claims priority to German Patent Application Serial No. 102014113837.6, which was filed on 24 Sep. 2014, and the entire disclosure of which is incorporated herein by reference.

FIELD

The invention concerns a device for delivering a medium, especially tire sealant, which is to be delivered by means of a compressor from a container to a tire, wherein the compressor can be connected by a pipeline to the tire and a connection to the container emerges into this pipeline.

BACKGROUND

From DE 10 2004 042 911 A1 there is known a device for transporting a gas from a pressure space, especially for delivering a sealant from this container to a tire of a vehicle and for pumping up the tire. A compressor can be connected to the sealant container disclosed therein. This compressor can also be fashioned as a membrane compressor, which compresses air present in the sealing container in order to force sealant out from the sealant container.

Furthermore, there is known from WO 2010/066448 a device for delivery of a gas from a pressure space, especially for delivery of a sealant from this container to a tire of a vehicle and/or for pumping up the tire, wherein a piston can move in oscillation in the pressure space. The piston is also coordinated with a gear element, which transforms a rotating movement of the drive shaft of a drive unit into an oscillating movement.

BRIEF DESCRIPTION

The problem to be solved by the present invention is to simplify and improve such known devices for the delivery of a gas from a pressure space and for transporting of a medium.

The solution of the problem is achieved, on the one hand, in that the pipeline has a constriction upstream from the tire.

In a preferred sample embodiment, this constriction is similar to a Venturi nozzle. This means that a pressure increase or acceleration of the gas flow occurs in the pipeline. This creates an increased intake flow in the suction pipeline for the medium being delivered, especially the tire sealant, which ensures that the tire sealant is sucked more quickly and completely out from the corresponding container and transported onward, especially being taken to a tire. Of course, the scope of the invention includes any constriction which leads to an acceleration of the gas flow in the pipeline. The Venturi nozzle configuration is only one sample embodiment.

In a preferred sample embodiment of the invention, the connection to the tank for the medium being transported does not simply emerge into the pipeline, but rather the corresponding feed line for the medium extends along the gas flow pipeline. This occurs in trunk-like manner. This further improves the delivery of the medium to the gas flow.

The aforementioned device is further improved in that pipeline and connection are combined into a valve unit, which can be connected in bayonet fashion to the compression chamber. In the past, this "cylinder head" amounted to a major problem, since it consists of many individual parts and has many seals. According to the present invention, on the other hand, it is formed as a single piece, and preferably it is made of plastic. It is furthermore designed such that it can be connected in bayonet fashion to the compression chamber. That it, it is mounted on the compression chamber, turned slightly, and enters into a removable connection with the compression chamber or with the cylinder in which the compression chamber is situated.

For this simple invention, the compression chamber has a top collar molded on it, having a locking device enabling a bayonet-like connection to the valve unit. For this, the collar has a locking device with different configurations at its circumference. One configuration ensures that the valve unit with corresponding moldings, which likewise in turn allow a bayonet connection, can be mounted on the collar. The moldings on the valve unit have hooks which reach underneath the collar when the valve unit is turned. The rotary movement is then limited by an end stop on the collar.

Preferably according to the present invention, yet another seal is provided between valve unit and compression chamber. In one preferred sample embodiment, this seal has the shape of a disk and is pressed by the valve unit or a corresponding molding when the valve unit is mounted against an outlet opening for pressurized gas from the compression chamber. The disk-like seal is flexible, so that pressurized gas can in particular force up the edges of the seal and thus get into the delivery pipeline. If, on the other hand, air is being taken in, the seal hermetically closes off the opening to the compression chamber.

In another embodiment of the invention, the seal has a shuttlecock configuration and has a ball with which the opening to the compression chamber is closed. Under the pressure of the pressurized gas from the compression chamber, the shuttlecock is lifted, being flexibly braced against corresponding webs.

But the present invention also and in particular pertains to the compressor and improving its mode of operation. The compressor here has a motor, which is eccentrically connected via a power takeoff gear to a piston rod, which moves a piston in the compression chamber. According to the invention, the power takeoff gear has a transmission gear inserted upstream from it. Transmission gear and power takeoff gear are so attuned to each other that a different power transmission can occur depending on which toothings are engaged. For this, it is provided that the power takeoff gear consists of two half gears, lying one against the other. Each half gear has a toothing, but not extending over the entire circumference, and instead only extending for a predetermined radian measure. In the preferred sample embodiment this radian measure is 180°.

The transmission gear on the other hand consists of two gears situated one on top of the other, interacting in alternation with one or the other half gear of the power takeoff gear. One gear has a larger diameter than the other gear. The gear with the smaller diameter can apply a greater force to the power takeoff gear than the gear with the larger diameter. Therefore, the gear with the smaller diameter engages with the corresponding toothing of the power takeoff gear when air needs to be compressed in the compression chamber.

On the other hand, if air is merely being taken in, the gear with the larger diameter engages with the toothing of the power takeoff half gear coordinated with it.

BRIEF DESCRIPTION OF THE DRAWINGS

Further benefits, features and details of the invention will emerge from the following description of preferred sample embodiments and also with the help of the drawing; this shows FIG. 1, a perspective view of a compressor according to the invention.

DETAILED DESCRIPTION

Figure 1:
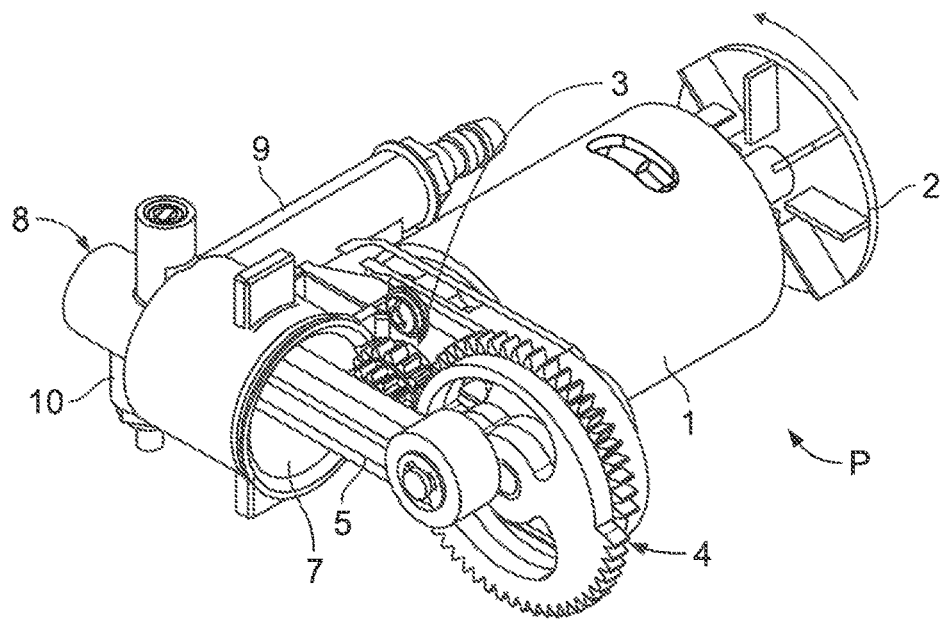
Figure 2:
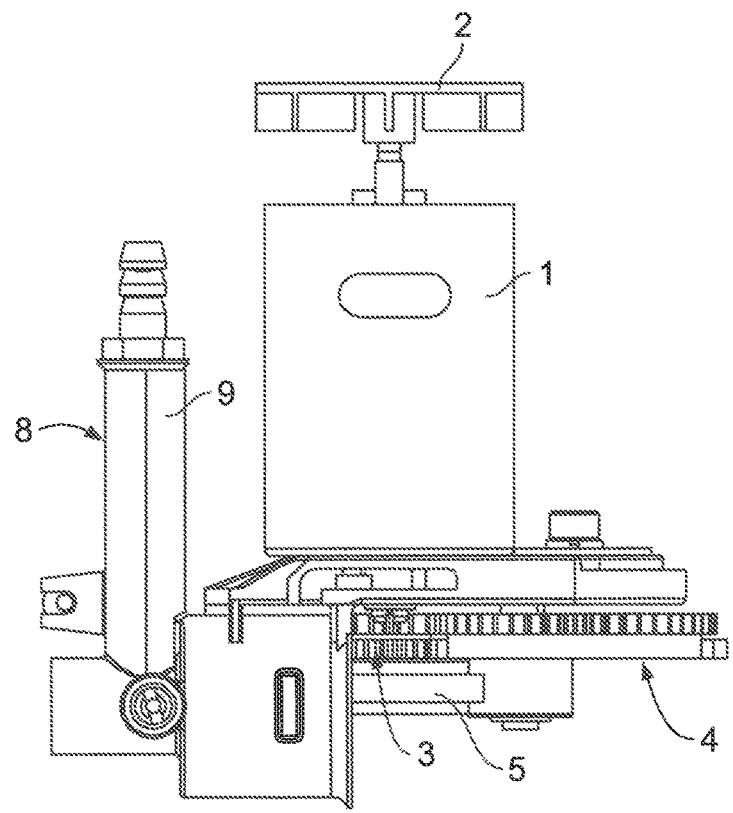
FIG. 2, a top view of the compressor of FIG. 1.

According to FIG. 1, a compressor P according to the invention has a motor 1, which is cooled by a fan 2. On a motor shaft not otherwise shown there sits a transmission gear 3, which interacts with a power takeoff gear 4.

Figure 3:
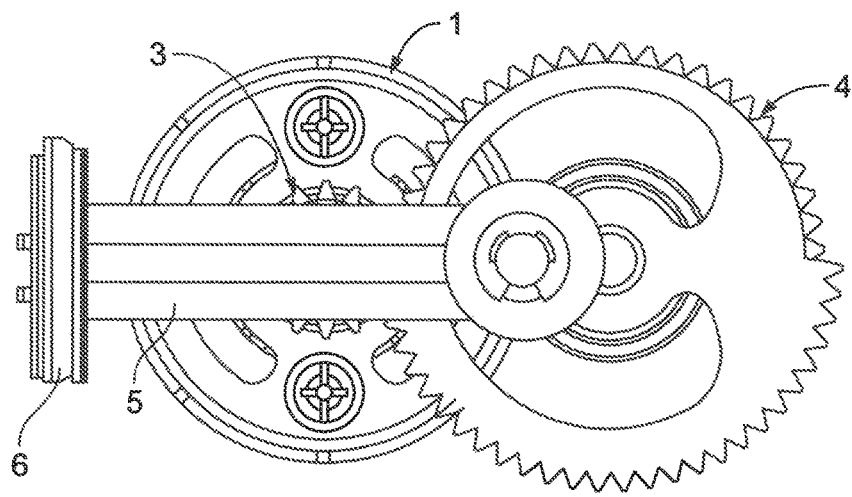
FIG. 3, a partly represented view of the compressor of FIG. 2 looking in the X direction.
Figure 4:
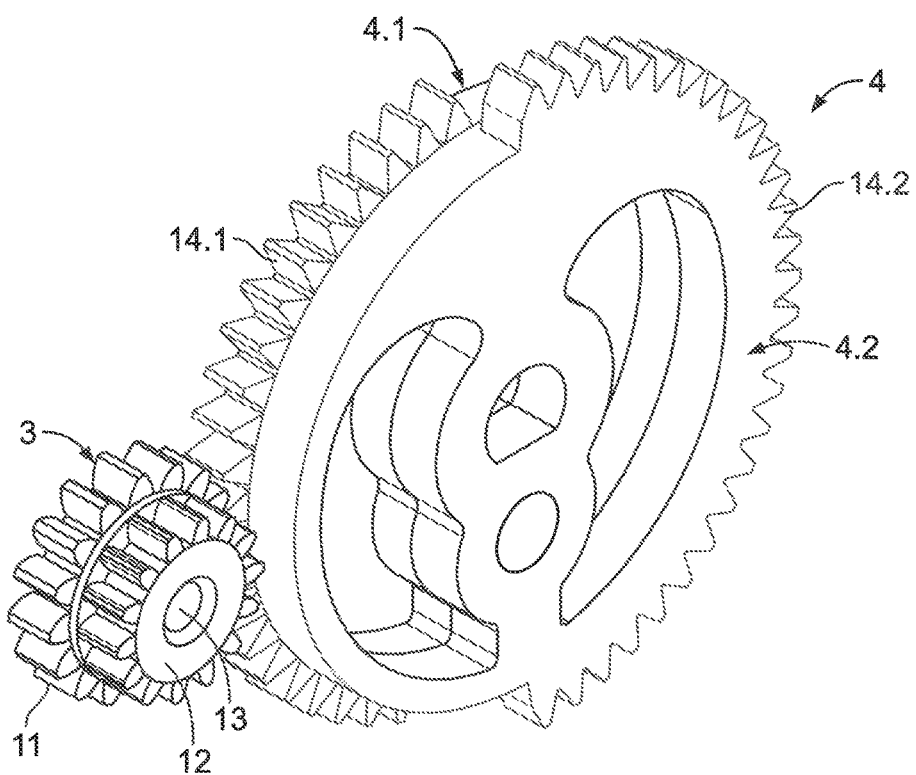
FIG. 4, a perspective view of the interworking of a transmission gear with a power takeoff gear.

The power takeoff gear 4 is eccentrically connected to a piston rod 5, which moves a piston 6 (FIG. 3) in a compression chamber 7. Mounted on this compression chamber 7 is a valve unit 8, which has a pipeline 9 to a tire, for example, and a connection 10 to a container for tire sealant, for example.

The mode of operation of this compressor is as follows:

The transmission gear 3 is placed in rotary motion by the motor 1 and transfers its rotary motion to the power takeoff gear 4. This, in turn, moves the piston rod 5 in the compression chamber 7, as is shown in particular in FIGS. 9 to 12. In this way, air is forced from the compression chamber 7 into the valve unit 8 and into the pipeline 9. Then, across the connection 10, a medium, especially a tire sealant, is either sucked out from a not otherwise shown container or forced additionally into the pipeline 9 and thus brought for example into a tire being sealed.

A portion of the present invention pertains to an improvement of the power transmission of the power of the motor 1 to the piston rod 5 or the piston 6. It is known that more power is needed for compressing the air in the compression chamber 7 than when sucking new air into the compression chamber. In order to deal with this power relationship, preferably both the transmission gear 3 and the power takeoff gear 4 are designed as two-part. The transmission gear 3 consists of two gears 11 and 12, lying one against the other and having a congruent opening 13 to receive a motor shaft. Moreover, the gear 11 also has a larger diameter than the gear 12.

The power takeoff gear 4 consists of two halves 4.1 and 4.2. Each half is occupied by a toothing 14.1 and 14.2. Each toothing 14.1 and 14.2 extends over only one half circle of the particular power takeoff half gear 4.1 and 4.2, while the other half is free of toothing. Here as well, it is provided that the power takeoff half gear 4.2 with the toothing 14.2 has a larger diameter than the power takeoff half gear 4.1 with the toothing 14.1. The gear 12 with the smaller diameter interacts with the power takeoff half gear 4.2 with the larger diameter, while the gear 11 with the larger diameter interacts with the power takeoff half gear 4.1 with the smaller diameter. As soon as the gear 12 with the smaller diameter engages with the toothing 14.2 of the power takeoff half gear 4.2, the transmission ratio can therefore apply a greater force, so that this engaged state is preferred when a larger force needs to be acting on the piston 6 during the compressing. When the piston 6 returns to suctioning of new air into the compression chamber 7, the gear 11 with the larger diameter is then in engagement with the toothing 14.1 of the power takeoff gear 4.1 with the smaller diameter.

Figure 5:
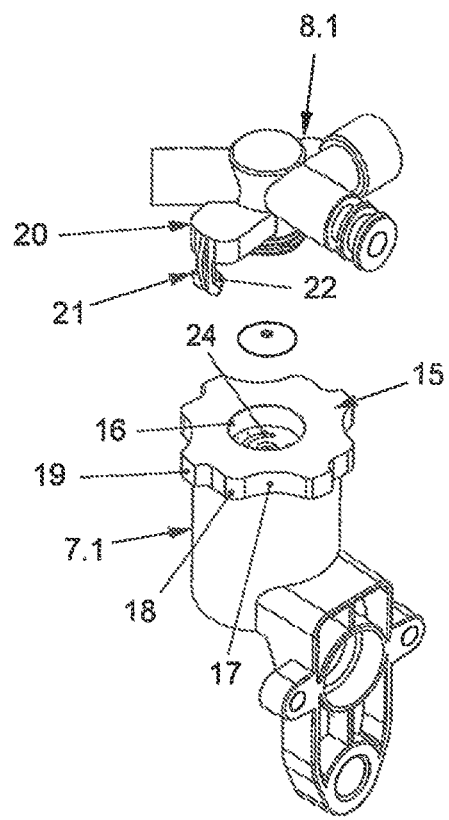
FIG. 5, an exploded representation of an arrangement of compression chamber and valve unit according to the invention.
Figure 6:
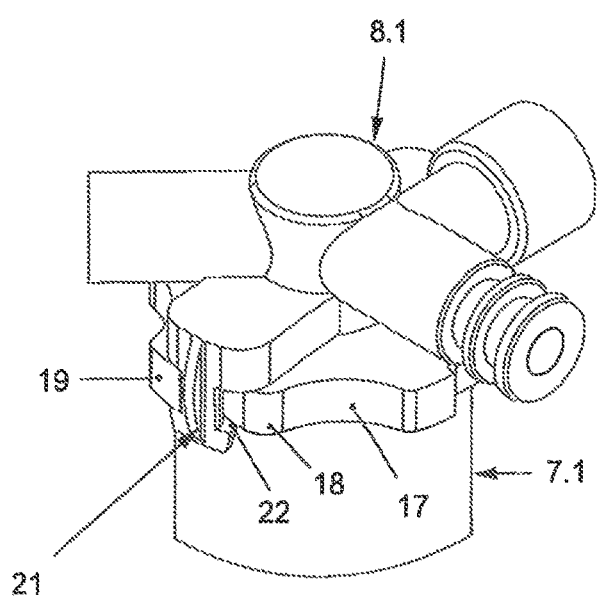
FIG. 6, a perspective view of the compression chamber of FIG. 5 with valve unit mounted.

A further notion of the invention pertains to the arrangement of valve unit and compression chamber. In FIGS. 5 and 6 a valve unit 8.1 is shown which is mounted on a compression chamber 7.1 in bayonet fashion. For this, the compression chamber 7.1 has a collar 15, which is provided with a locking element. This locking element surrounds a connection opening 16 between valve unit 8.1 and compression chamber 7.1. Next comes a shoulder 18 on a deep indentation 17, adjoined by an end stop 19.

The valve unit 8.1, in turn, has at least one vane 20, from which a hook-like molding 21 projects downward. For the assembly process, the valve unit 8.1 is placed on top of the collar 15, while the molding 21 travels across the deep indentation 17. Now the valve unit 8.1 is turned relative to the annular collar 15, so that the hook-like molding 21 travels across the shoulder 18 and reaches under a hook 22. The rotation can then occur as far as the end stop 19. This results in the assembly position shown in FIG. 6.

Figure 7:
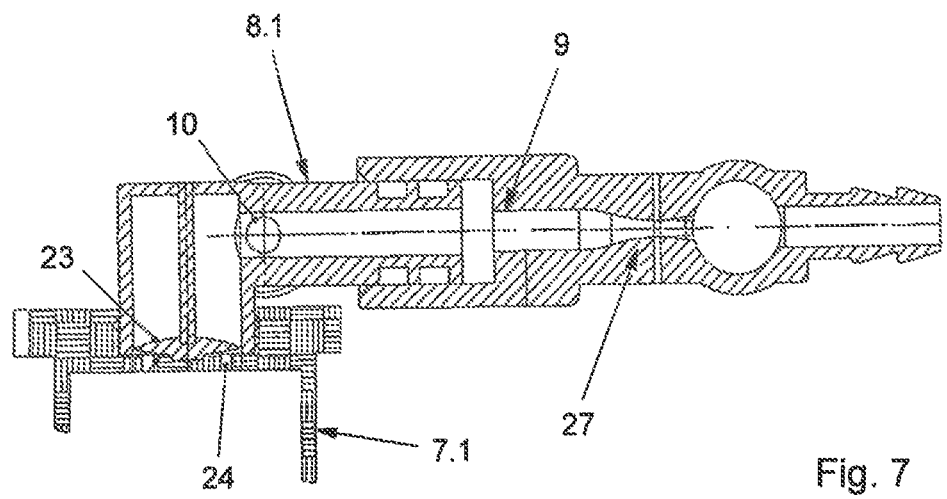
FIG. 7, a partly represented longitudinal section through the arrangement of a sample embodiment of compression chamber with mounted valve unit similar to FIG. 6.

In one sample embodiment of the invention, which is shown especially in FIG. 7, a seal is arranged between the compression chamber 7.1 and the valve unit 8.1 in the region of the connection opening 16, being shaped like a discus in this sample embodiment. Corresponding air openings 24 are then configured as oblong holds. When compressed air is delivered from the compression chamber 7.1, the edges of the disk-like seal 23 are lifted in particular.

In another sample embodiment of the seal between compression chamber 7.2 and valve unit 8.2 according to FIGS. 9 to 12, the seal is designed as a shuttlecock. This shuttlecock seal 25 moves in a chamber 26 of the valve unit 8.2 from an opening position to a closed position depending on whether air is being brought in from the compression chamber 7.2 or needs to be drawn into the compression chamber 7.2.

Figure 8:
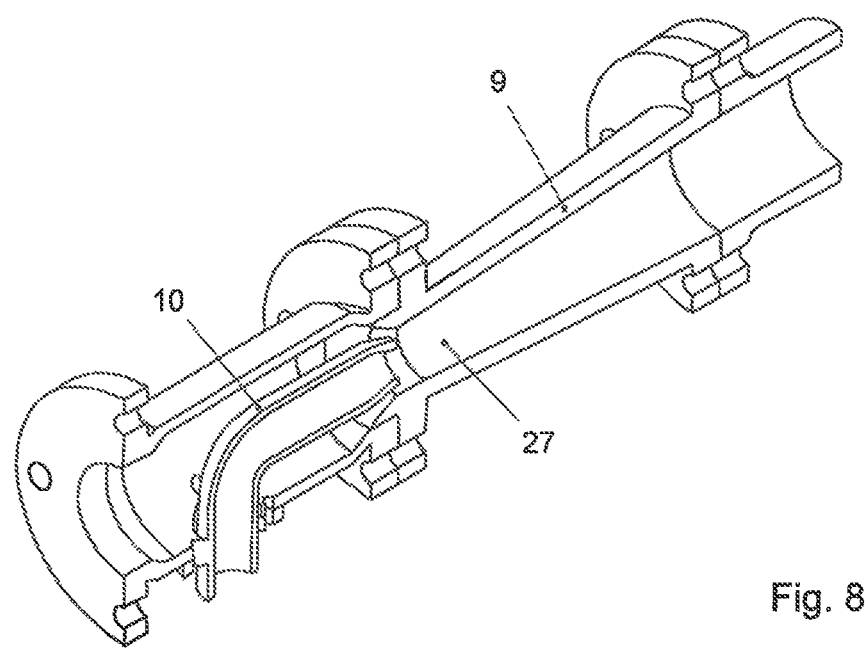
FIG. 8, a perspective view of the longitudinal section of FIG. 7 in another embodiment.
Figure 9:
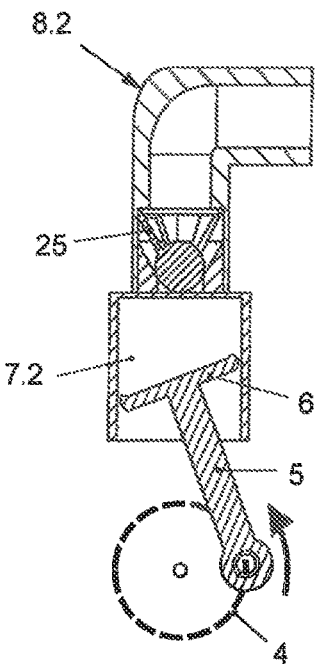
FIGS. 9 to 12, longitudinal sections of another sample embodiment of a compression chamber with mounted valve unit and piston rod driven like a connecting rod in various positions of use.
Figure 10:
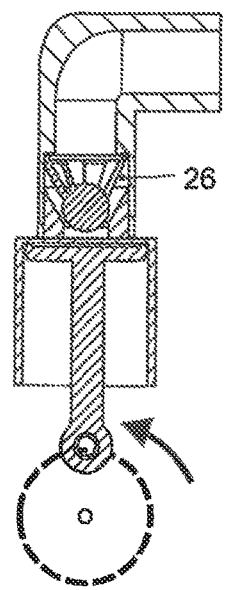
Figure 11:
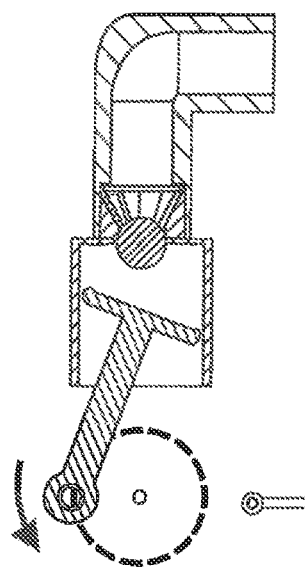
Figure 12:
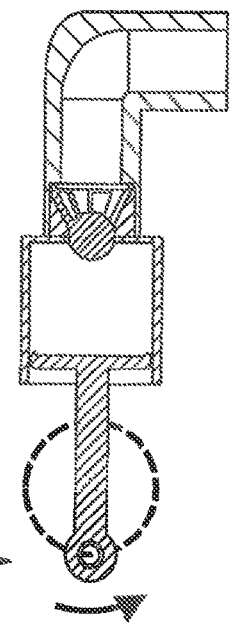

The notion of the invention which is shown in FIGS. 7 and 8 contributes to a further improvement. Here, the pipeline 9 downstream from the connection 10 to the container for tire sealant is provided with a Venturi-type constriction 27. This Venturi-type constriction 27 has the purpose of accelerating the air flow, which increases the partial vacuum in the pipeline 9, so that an increased suction of tire sealant from the container occurs. In order to further improve this, the connection 10 extends for a certain extent axially in trunk-like manner along the pipeline 9.

The invention claimed is:

1. A compressor for delivering a medium from a container to a tire, the compressor comprising:
   a motor;
   a power takeoff gear including first and second half takeoff gears each with a toothing, the toothing of the first half takeoff gear extending across a first radian measure and the toothing of the second half takeoff gear extending across a second radian measure;

a piston rod in a compression chamber; and a transmission gear including first and second transmission gears situated one on top of each other, the first transmission gear positioned to interact in alternation with the first half power takeoff gear and the second transmission gear positioned to interact in alternation with the second half power takeoff gear, wherein the motor is eccentrically connected via the power takeoff gear to the piston rod and is configured to move the piston in the compression chamber by rotating the power takeoff gear and the transmission gear, and wherein the transmission gear is upstream from the power takeoff gear.

2. The compressor according to claim 1, wherein the first radian measure is 180°.

3. The compressor according to claim 1, wherein the first transmission gear has a larger diameter than the second transmission gear.

4. The compressor according to claim 1, wherein the medium is a tire sealant.

5. A device for delivering a medium to a tire, comprising:

a motor;

a valve unit having a medium connection in fluid communication with a medium supply, the valve unit also having a pipeline in fluid communication with the medium connection and configured for engagement with the tire;

a compressor having a compression chamber operatively connected to the valve unit, the compressor also having a piston movably mounted within the compression chamber for movement according to a compression mode of the compressor and for movement according to a suction mode of the compressor;

a power takeoff gear connected between the motor and the compressor for movement of the piston according to the compression mode and according to the suction mode, wherein the power takeoff gear transfers greater force from the motor to the compressor during the compression mode than during the suction mode, wherein the power takeoff gear includes first and second half power takeoff gears each with a toothing, wherein the toothing of the first half power takeoff gears extends across one radian measure and the toothing of the second half power takeoff gear extends across another radian measure; and a transmission gear that includes first and second transmission gears situated one on top of each other, the first transmission gear interacting in alternation with the first half power takeoff gear, the second transmission gear interacting in alternation with the second half power takeoff gear, wherein movement of the piston during the suction mode moves the medium from the medium supply through the medium connection to the pipeline, and wherein movement of the piston during the compression mode moves the medium from the pipeline to the tire.

6. The device according to claim 5, wherein the pipeline includes a constriction configured to increase the flow of the medium downstream of the construction during the compression mode.

7. The device according to claim 6, wherein the medium connection extends into the pipeline in the direction of the constriction for delivery of the medium upstream of the constriction.

8. The device according to claim 5, wherein the medium is a tire sealant.

9. The device of claim 5, wherein a connection opening between the valve unit and the compression chamber is occupied by a seal.

10. The device of claim 9, wherein the seal is a flexible disk.

11. The device according to claim 9, wherein the seal is configured as a shuttlecock.

* * * * *